(12) United States Patent
Arora et al.

(10) Patent No.: US 8,006,221 B2
(45) Date of Patent: Aug. 23, 2011

(54) SYSTEM AND METHOD FOR TESTING MULTIPLE PROCESSOR MODES FOR PROCESSOR DESIGN VERIFICATION AND VALIDATION

(75) Inventors: Sampan Arora, Karnataka (IN); Shubhodeep Roy Choudhury, Karnataka (IN); Manoj Dusanapudi, Karnataka (IN); Sunil Suresh Hatti, Karnataka (IN); Shakti Kapoor, Austin, TX (US); Sai Rupak Mohanan, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 11/853,170

(22) Filed: Sep. 11, 2007

(65) Prior Publication Data
US 2009/0070629 A1    Mar. 12, 2009

(51) Int. Cl.
*G06F 17/50* (2006.01)
(52) U.S. Cl. .................................... 716/136; 716/110
(58) Field of Classification Search .................. 716/4–6, 716/110–112, 136
See application file for complete search history.

(56) References Cited

U.S. PATENT DOCUMENTS

| | | | | |
|---|---|---|---|---|
| 4,800,486 A | 1/1989 | Horst | ............................. | 364/200 |
| 4,910,663 A | 3/1990 | Bailey | ............................. | 714/34 |
| 5,133,061 A | 7/1992 | Melton et al. | ................. | 711/128 |
| 5,182,811 A | 1/1993 | Sakamura | ...................... | 710/264 |
| 5,202,889 A | 4/1993 | Aharon | ........................... | 371/27 |
| 5,216,672 A | 6/1993 | Tatosian et al. | ............... | 714/718 |
| 5,218,703 A | 6/1993 | Fleck et al. | .................... | 710/264 |
| 5,331,643 A | 7/1994 | Smith | ............................ | 714/728 |
| 5,396,619 A | 3/1995 | Walton | ............................. | 714/8 |
| 5,426,750 A | 6/1995 | Becker et al. | ................. | 711/207 |
| 5,469,443 A | 11/1995 | Saxena | .......................... | 714/720 |
| 5,475,822 A | 12/1995 | Sibigtroth et al. | ............ | 712/228 |
| 5,488,573 A | 1/1996 | Brown | .......................... | 364/578 |
| 5,584,013 A | 12/1996 | Cheong et al. | ................ | 711/122 |
| 5,701,495 A | 12/1997 | Arndt et al. | ................... | 710/263 |
| 5,761,408 A | 6/1998 | Kolawa | ........................... | 714/38 |

(Continued)

FOREIGN PATENT DOCUMENTS

JP        2000020341 A2    1/2000

(Continued)

OTHER PUBLICATIONS

Notice of allowance for U.S. Appl. No. 11/853,100, mailed Oct. 6, 2009, 8 pages.

(Continued)

*Primary Examiner* — Jack Chiang
*Assistant Examiner* — Binh C Tat
(74) *Attorney, Agent, or Firm* — VanLeeuwen & VanLeeuwen; Matthew B. Talpis

(57) ABSTRACT

A system and method for generating a test case and a bit mask that allows a test case executor the ability to re-execute the test case multiple times using different machine state register bit sets. A test case generator creates a bit mask based upon identified invariant bits and semi-invariant bits. The test case generator includes compensation values corresponding to the semi-invariant bits into a test case, and provides the test case, along with the bit mask, to a test case executor. In turn, the test case executor dispatches the test case multiple times, each time with a different machine state register bit set, to a processor. Each of the machine state register bit sets places the processor in different modes.

20 Claims, 7 Drawing Sheets

U.S. PATENT DOCUMENTS

| | | | |
|---|---|---|---|
| 5,784,550 A | 7/1998 | Brockmann et al. | 714/33 |
| 5,784,606 A | 7/1998 | Hoy et al. | 714/33 |
| 5,784,698 A | 7/1998 | Brady et al. | 711/171 |
| 5,815,696 A | 9/1998 | Tanaka et al. | 712/233 |
| 5,822,578 A | 10/1998 | Frank et al. | 712/244 |
| 5,996,097 A | 11/1999 | Evans et al. | 714/719 |
| 6,006,028 A | 12/1999 | Aharon et al. | 703/21 |
| 6,014,756 A | 1/2000 | Dottling et al. | 714/15 |
| 6,019,501 A | 2/2000 | Okazaki | 714/718 |
| 6,070,218 A | 5/2000 | Giles et al. | 710/260 |
| 6,070,220 A | 5/2000 | Katayama | 710/264 |
| 6,157,980 A | 12/2000 | Arimilli et al. | 711/3 |
| 6,167,479 A | 12/2000 | Hartnett et al. | 710/260 |
| 6,212,613 B1 | 4/2001 | Belair | 711/207 |
| 6,223,271 B1 | 4/2001 | Cepulis | 711/206 |
| 6,223,337 B1 | 4/2001 | Blume | 717/4 |
| 6,226,716 B1 * | 5/2001 | Bauman et al. | 711/145 |
| 6,253,338 B1 | 6/2001 | Smolders | 714/45 |
| 6,286,116 B1 | 9/2001 | Bhavsar | 714/720 |
| 6,367,042 B1 | 4/2002 | Phan | 714/733 |
| 6,381,715 B1 | 4/2002 | Baumann et al. | 714/718 |
| 6,609,216 B1 | 8/2003 | Almy et al. | 714/25 |
| 6,662,297 B1 | 12/2003 | Boom et al. | 712/245 |
| 6,675,338 B1 | 1/2004 | Golshan | 714/739 |
| 6,684,359 B2 | 1/2004 | Noy | 714/741 |
| 6,694,461 B1 | 2/2004 | Treuer | 714/719 |
| 6,701,461 B2 | 3/2004 | Oura | 714/42 |
| 6,735,746 B2 | 5/2004 | Thompson et al. | 716/136 |
| 6,772,326 B2 | 8/2004 | Chauvel et al. | 712/244 |
| 6,865,501 B2 | 3/2005 | Huisman et al. | 702/117 |
| 6,920,416 B1 * | 7/2005 | Swoboda et al. | 703/13 |
| 6,950,771 B1 | 9/2005 | Fan et al. | 702/117 |
| 6,968,428 B2 | 11/2005 | Maly et al. | 711/128 |
| 6,993,685 B2 | 1/2006 | Ramaswamy | 714/43 |
| 7,010,734 B2 | 3/2006 | Brahme | 714/724 |
| 7,013,383 B2 | 3/2006 | Shelor | 712/244 |
| 7,020,854 B2 * | 3/2006 | Killian et al. | 716/1 |
| 7,058,909 B2 | 6/2006 | Lu | 16/4 |
| 7,073,106 B2 | 7/2006 | Paredes | 714/720 |
| 7,111,287 B2 | 9/2006 | Garvey | 717/124 |
| 7,133,816 B2 | 11/2006 | Adir | 703/14 |
| 7,222,179 B2 | 5/2007 | Srivastava et al. | 709/226 |
| 7,240,243 B2 | 7/2007 | Decker | 714/33 |
| 7,356,436 B2 | 4/2008 | Bohizic et al. | 702/119 |
| 7,373,446 B2 | 5/2008 | Post et al. | 710/261 |
| 7,536,694 B2 | 5/2009 | Blinick et al. | 719/310 |
| 7,669,083 B2 | 2/2010 | Arora et al. | 714/25 |
| 7,752,499 B2 | 7/2010 | Choudhury et al. | 714/25 |
| 7,797,650 B2 | 9/2010 | Bag et al. | 716/4 |
| 7,831,979 B2 | 11/2010 | Whalen | 718/108 |
| 2001/0007970 A1 | 7/2001 | Kohno et al. | 702/117 |
| 2003/0097550 A1 | 5/2003 | Chauvel et al. | 712/244 |
| 2004/0143720 A1 | 7/2004 | Mansell et al. | 711/206 |
| 2004/0143819 A1 | 7/2004 | Cheng et al. | 717/125 |
| 2004/0268103 A1 | 12/2004 | Shelor | 712/244 |
| 2005/0159925 A1 | 7/2005 | Gedamu | 702/186 |
| 2005/0204231 A1 | 9/2005 | Mukherjee et al. | 714/733 |
| 2005/0210452 A1 | 9/2005 | Dimpsey et al. | 717/120 |
| 2005/0278702 A1 | 12/2005 | Koyfman et al. | 717/124 |
| 2006/0101181 A1 | 5/2006 | Post et al. | 710/266 |
| 2006/0149952 A1 | 7/2006 | Blinick et al. | 712/244 |
| 2006/0161897 A1 | 7/2006 | Biberstein et al. | 717/124 |
| 2006/0195573 A1 | 8/2006 | Srivastava et al. | 709/224 |
| 2006/0212756 A1 | 9/2006 | Emek et al. | 714/30 |
| 2006/0224863 A1 | 10/2006 | Lovett et al. | 712/215 |
| 2009/0070643 A1 | 3/2009 | Anvekar et al. | 714/718 |
| 2009/0300441 A1 | 12/2009 | Andreev et al. | 714/718 |

FOREIGN PATENT DOCUMENTS

| | | |
|---|---|---|
| TW | 0440765 B | 6/2001 |

OTHER PUBLICATIONS

Office action for U.S. Appl. No. 11/853,154, mailed May 25, 2010, 10 pages.

Office action for U.S. Appl. No. 11/853,154, mailed Nov. 5, 2010, 8 pages.

Hubbard, PJ, "Memory Testing With Linear Feedback Shift Register," IBM Technical Disclosure Bulletin, 11-86 p. 2475, 1986.

Notice of Allowance for U.S. Appl. No. 11/853,154, mailed Feb. 22, 2011, 5 pages.

Office Action for U.S. Appl. No. 11/853,163, mailed Jan. 22, 2010, 6 pages.

Notice of Allowance for U.S. Appl. No. 11/853,163, mailed May 11, 2010, 9 pages.

Office Action for U.S. Appl. No. 11/853,170, mailed Oct. 12, 2010, 7 pages.

Arimilli, et al., "High-Performance Combined Data/Address Memory Test," IBM Technical Disclosure, n7 12-90 p. 104-108, 1990.

Notice of allowance for U.S. Appl. No. 11/853,189, mailed Feb. 22, 2010, 9 pages.

Office Action for U.S. Appl. No. 11/853,208, mailed Jan. 31, 2011, 24 pages.

Office Action for U.S. Appl. No. 11/853,212, mailed Aug. 24, 2009, 13 pages.

Office Action for U.S. Appl. No. 11/853,212, mailed Mar. 4, 2010, 12 pages.

Office Action for U.S. Appl. No. 11/853,212, mailed Aug. 13, 2010, 12 pages.

Notice of Allowance for U.S. Appl. No. 11/853,212, mailed Feb. 4, 2011, 5 pages.

Notice of Allowance for U.S. Appl. No. 11/853,212, mailed Mar. 10, 2011, 15 pages.

Notice of Allowance for U.S. Appl. No. 11/853,154, mailed Apr. 18, 2011, 11 pages.

Office Action for U.S. Appl. No. 11/853,201, mailed Apr. 14, 2011, 20 pages.

Final Office Action for U.S. Appl. No. 11/853,208, mailed Jun. 7, 2011, 29 pages.

* cited by examiner

SYSTEM AND METHOD FOR TESTING MULTIPLE PROCESSOR MODES FOR PROCESSOR DESIGN VERIFICATION AND VALIDATION

BACKGROUND OF THE INVENTION

1. Technical Field

The present invention relates to a system and method for testing multiple processor modes for processor design verification and validation. More particularly, the present invention relates to a system and method for generating a test case and a bit mask that allows a test case executor the ability to re-execute the test case multiple times using different machine state register bit sets.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases.

One aspect of design verification and validation is testing different processor modes. A processor typically includes a machine state register that controls the processor's mode of execution. The machine state register typically includes numerous bits that, in turn, allows for many different valid bit combinations. A challenge found is that a multitude of test cases are typically generated in order to test the different machine state register bit set combinations, which requires a tremendous amount of time.

What is needed, therefore, is a system and method for efficiently testing a processor's different processing modes.

SUMMARY

It has been discovered that the aforementioned challenges are resolved using a system and method for generating a test case and a bit mask that allows a test case executor the ability to re-execute the test case multiple times using different machine state register bit sets, each execution ending with the same result. A test case generator creates a bit mask based upon identified invariant bits and semi-invariant bits. The test case generator includes compensation values corresponding to the semi-invariant bits into a test case, and provides the test case, along with the bit mask, to a test case executor. In turn, the test case executor dispatches the test case multiple times, each time with a different machine state register bit set, to a processor. Each of the machine state register bit sets places the processor in different modes.

A test case generator operates in a user mode and generates a test case for use in testing a processor's modes. The test case includes a bit mask, which informs a test case executor as to which machine state register bits are test case invariant. Meaning, these bits may be changed without altering the outcome of the test case. The test case may also include compensation values for semi-invariant bits whose test case results require compensation when the semi-invariant bits are changed.

The test case generator sends the test case to a test case executor, which operates in a kernel mode. The test case executor includes a scheduler that configures a "first machine state register bit set" based upon the bit mask, and provides the test case and the first machine state register bit set to a dispatcher. In turn, the dispatcher dispatches the test case with the first machine state register bit set to a processor.

The processor loads the first machine state register bit set into its machine state registers, which places the processor into a particular processor mode. The processor proceeds to execute the test case in the processor mode and, when finished executing the test case, the processor passes hardware results to a results comparator. The results comparator evaluates the results and sends a pass or fail message to the scheduler.

When the hardware results pass, the scheduler uses the bit mask to re-configure the machine state register bits into a second machine state register bit set. Next, the scheduler passes the test case and the second machine state register bit set to the dispatcher, which dispatches the test case with the second machine state register bit set, to the processor.

The processor loads the second machine state register bit set into its machine state register, which places the processor into a different processor mode. The processor proceeds to execute the same test case in the different processor mode, and passes hardware results to the results comparator. Again, the results comparator evaluates the results and sends a pass or fail message to the scheduler.

The test case executor proceeds to dispatch the same test case "n" times with "n" different machine state register bit sets in order to test the processor's different machine state register configurations. By using the same test case, less time is spent generating test cases, which allows more time to test the processor's modes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
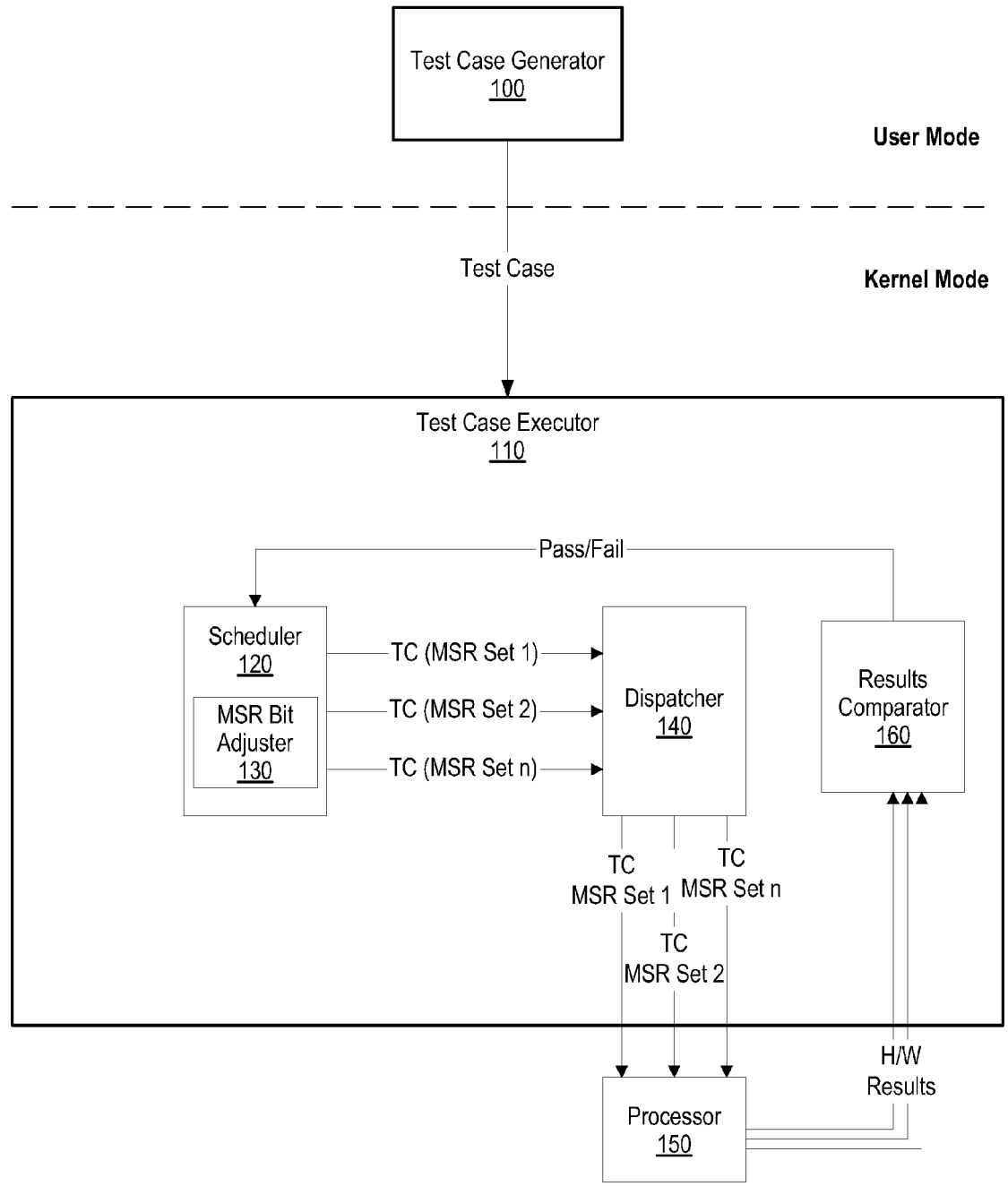
FIG. 1 is a diagram showing a test case executor re-scheduling and re-dispatching a test case with multiple machine state register bit sets to a processor in order to test different processor modes.

FIG. 1 is a diagram showing a test case executor re-scheduling and re-dispatching a test case with multiple machine state register bit sets to a processor in order to test different processor modes. By using the same test case, less time is spent generating test cases, which allows more time to test processor 150's modes.

Test case generator 100 operates in a user mode and generates a test case for use in testing processor 150's processor modes. The test case includes a bit mask, which informs test case executor 110 as to which machine state register bits are test case invariant. Meaning, these bits may be changed without altering the outcome of the test case. The test case may also include compensation values for semi-invariant bits whose results require compensation when changed (see FIG. 3 and corresponding text for further details).

Test case executor 110 operates in a kernel mode, and receives the test case from test case generator 100. Scheduler 120 configures a first machine state register bit set based upon the bit mask, and provides the test case and the first machine state register bit set to dispatcher 140. In turn, dispatcher 140 dispatches the test case with the first machine state register bit set to processor 150.

Figure 2:
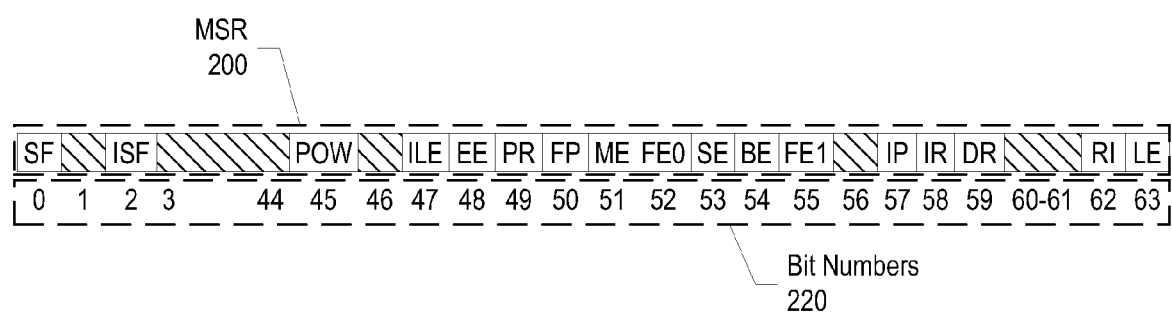
FIG. 2 is a diagram showing an example of a machine state register.

Processor 150 loads the first machine state register bit set into its machine state register, which places processor 150 into a particular processor mode (see FIG. 2 and corresponding text for further details). Processor 150 proceeds to execute the test case in the processor mode and, when finished executing the test case, processor 150 passes hardware results to results comparator 160. Results comparator 160 evaluates the results and sends a pass or fail message to scheduler 120.

When the hardware results pass, machine state register bit adjuster 130 uses the bit mask to re-configure the machine state register bits into a second machine state register bit set. In turn, scheduler 120 passes the test case and the second machine state register bit set to dispatcher 140, which dispatches the test case with the second machine state register bit set to processor 150.

Processor 150 loads the second machine state register bit set into its machine state register, which places processor 150 into a different processor mode. Processor 150 proceeds to execute the test case in the different processor mode, and passes hardware results to results comparator 160. Again, results comparator 160 evaluates the results and sends a pass or fail message to scheduler 120.

Test case executor 110 proceeds to dispatch the same test case "n" times with "n" different machine state register bit sets in order to test processor 150's different machine state register configurations. As can be seen, test case generator 100 generated one test case for use in fully testing processor 150's processor modes.

FIG. 2 is a diagram showing an example of a machine state register. Machine state register 200 resides within a processor and includes particular machine state register bit values. FIG. 2 also shows bit numbers 220, which correspond to particular locations for particular bits within machine state register 200. The machine state register defines the state of the processor and includes numerous bits as discussed below. As one skilled in the art can appreciate, a machine state register may include different bits, more bits, or fewer bits than what is shown in FIG. 2.

Machine state register 200 may be a 64-bit register for 64-bit implementations, and a 32-bit register for 32-bit implementations. The example shown in FIG. 2 includes a SF (Sixty-Four) bit, which places the processor in either a 64-bit mode (1) or a 32-bit mode (0). The invention described herein forces the SF bit to a 1 in order to place the processor in a 64-bit mode and fully test each processor mode. The ISF (exception 64-bit mode) is used to copy into the SF bit when an exception occurs to select 64-bit or 32-bit mode for the context established by the exception.

POW (Power Management Enable) either disables power management (0) or enables power management (1). ILE (Exception little-endian mode) is used to copy into the LE bit (discussed below) when an exception occurs to select the endian mode for the context established by the exception. EE (external interrupt enable) is set to "0" to delay recognition of external interrupts and decrementer exception conditions, or set to "1" to take an external interrupt or the decrementer exception.

PR (Privilege Level) is set to 0 for a processor to execute both user-level and supervisor-level instructions, and set to 1 to only execute user-level instructions. FP (Floating Point) is set to 0 to prevent dispatching floating-point instructions, and is set to 1 to execute floating-point instructions. ME (Machine Check Enable) is set to 0 to disable machine check exceptions, and set to 1 to enable machine checks. FE0 and FE1 (Floating-Point Exception Mode 0 and 1) are used to specify various floating-point modes.

SE (Single-Step Trace Enable) is set to 0 to execute instructions normally, and set to 1 to generate single-step trace exceptions upon the successful execution of the next instruction. BE (Branch Trace Enable) is set to 0 to execute branch instructions normally, and set to 1 to generate a branch trace exception after completing the execution of a branch instruction, regardless of whether the branch was taken.

IP (Exception Prefix) specifies whether an exception vector offset is preprended with F's or 0's. IR (Instruction Address Translation) is set to 0 to disable instruction address translation, and is set to 1 to enable instruction address translation. DR (Data Address Translation) is set to 0 to disable data address translation, and is set to 1 to enable data address translation.

RI (Recoverable Exception) is set to 0 make exceptions not recoverable, and is set to 1 to make exceptions recoverable. LE (Little-Endian Mode Enable) is set to 0 to run in big-endian mode, and is set to 1 to run in little-endian mode.

Figure 3:
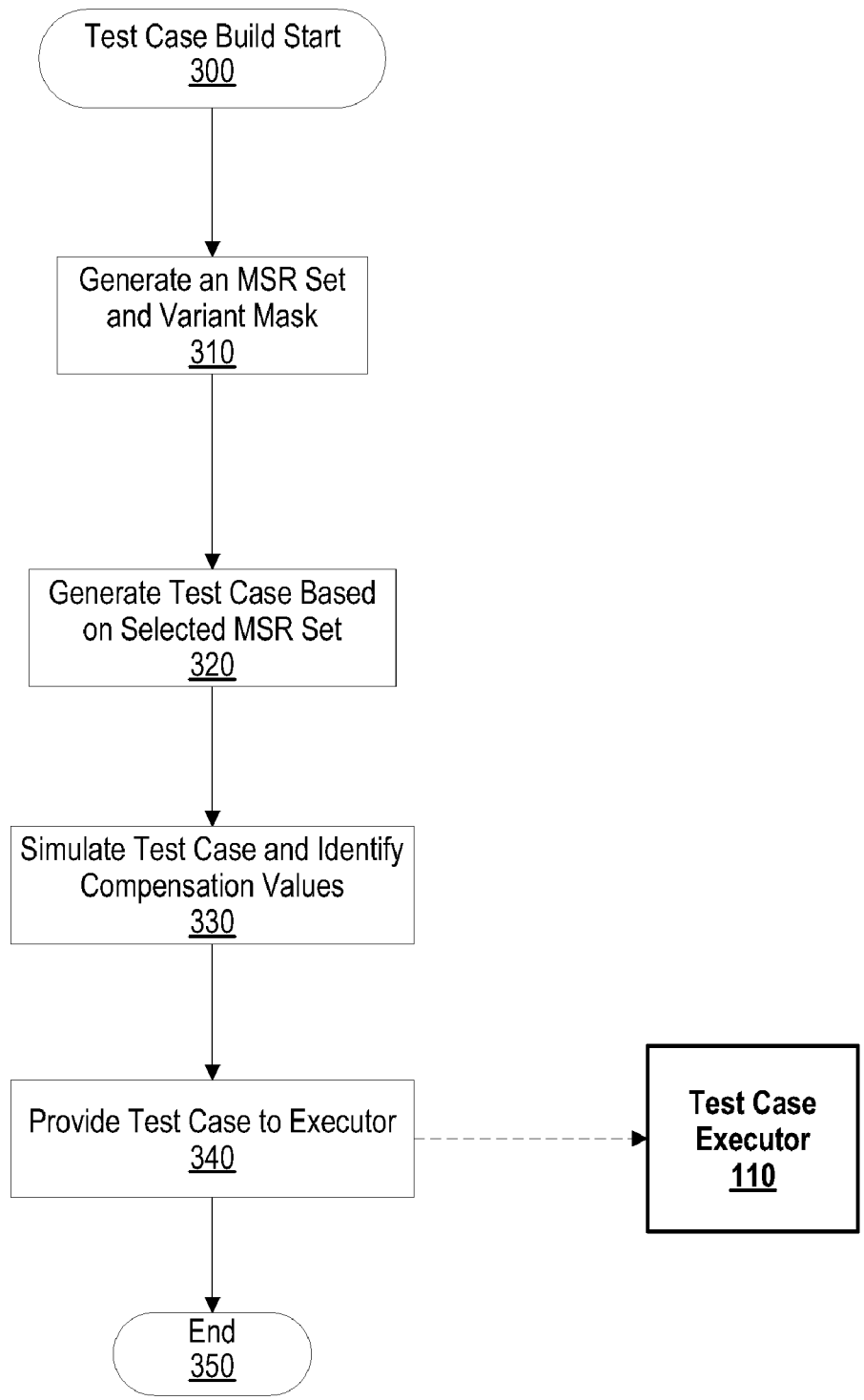
FIG. 3 is a flowchart showing steps taken in building a test case that includes a bit mask for re-configuring machine state register bits during test case execution.

FIG. 3 is a flowchart showing steps taken in building a test case that includes a bit mask for re-configuring machine state register bits during test case execution. Processing commences at 300, whereupon processing generates a machine state register (MSR) set and a variant mask (step 310). The variant mask identifies machine state register bits that, when changed, do not alter the results of the test case. At step 320, processing generates a test case based upon the selected machine state register set.

At step 330, processing simulates a test case and identifies compensation values for particular semi-invariant bits. Semi-invariant bits are machine state register bits that, when altered, may change the outcome of the test case but, however, the results are correctable by applying the compensation values. For example, if an instruction invokes a program interrupt in user mode, target register values are patched or compensated for in the interrupt handler in order produce the same test case results.

Figure 4:
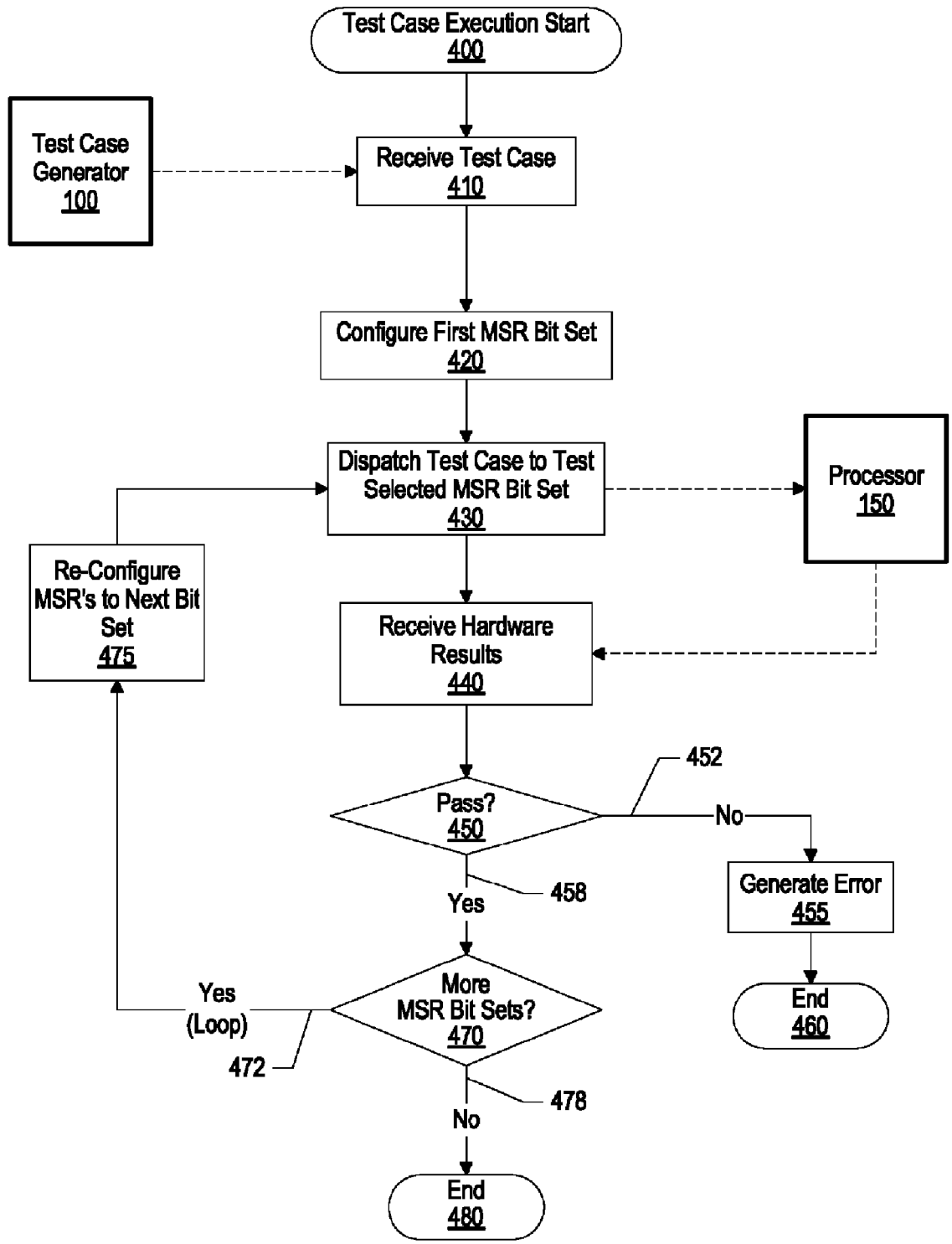
FIG. 4 is a flowchart showing steps taken in re-executing a test pattern with different machine state register bit sets.

At step 340, processing provides the test case to test case executor 110 for scheduling and dispatching (see FIG. 4 and corresponding text for further details). Test case generation ends at 350.

FIG. 4 is a flowchart showing steps taken in re-executing a test pattern with different machine state register bit sets. Processing commences at 400, whereupon a test case executor receives a test case from test case generator 100 at step 410.

The test case includes a bit mask that allows the test case executor to identify invariant bits and semi-invariant bits to alter in order to create different machine state register bit sets, which change processor 150's mode when executing the test case.

At step 420, processing configures the machine state register bits to a first machine state register bit set and, at step 430, processing dispatches the test case with the first machine state register bit set to processor 150. Processor 150 loads the first machine state register bit set, which places processor 150 into a first processor mode. Processor 150 then executes the test case while in the first processor mode.

Processing receives the test case results from processor 150 at step 440. A determination is made as to whether the test case results pass (decision 450). If the test case results do not pass, decision 450 branches to "No" branch 452 whereupon processing generates an error at step 455, and processing ends at 460.

On the other hand, if the test case results pass, decision 450 branches to "Yes" branch 458 whereupon a determination is made as to whether there are more machine state register bit sets to configure (e.g., change more invariant and semi-invariant bits). In one embodiment, the test case starts in a "mode" and, once the mode is executed, processing selects the next mode based on the bit mask. In this embodiment, machine state register bits for the next mode may be selected in the following manner:
1. Select the first bit from the left that can be set or unset based on the bit mask.
2. XOR the selected bit. Increment a marker to point to the next bit that can be changed. The marker tracks the current bit that is changed. The marker initially points to the first bit that can be changed.
3. Once the marker shifts to the end, and there are no more bits available to change, the marker points at the extreme left most bit (start bit) and repeats step 2.

If there are more machine state register bit sets to configure, decision 470 branches to "Yes" branch 472, which loops back to use the bit mask to re-configure the next machine state register bit set at step 475, and dispatches the same test case with the re-configured machine state register bit set to processor 150 to execute. This looping continues until there are no more machine state register bit sets to configure, at which point decision 470 branches to "No" branch 478 whereupon processing ends at 480.

Figure 5:
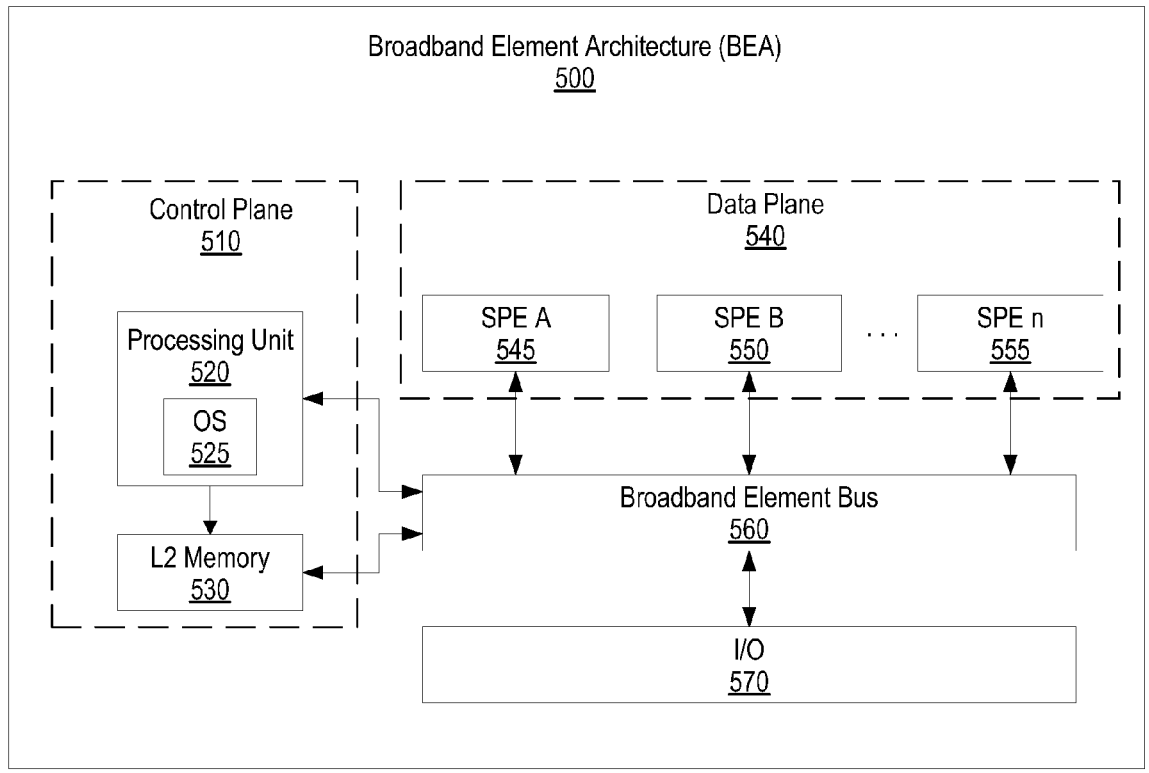
FIG. 5 is a diagram showing a broadband element architecture which includes a plurality of heterogeneous processors capable of implementing the invention described herein.

FIG. 5 is a diagram showing a broadband element architecture which includes a plurality of heterogeneous processors capable of implementing the invention described herein. The heterogeneous processors share a common memory and a common bus. Broadband element architecture (BEA) 500 sends and receives information to/from external devices through input output 570, and distributes the information to control plane 510 and data plane 540 using processor element bus 560. Control plane 510 manages BEA 500 and distributes work to data plane 540.

Control plane 510 includes processing unit 520 which runs operating system (OS) 525. For example, processing unit 520 may be a Power PC core that is embedded in BEA 500 and OS 525 may be a Linux operating system. Processing unit 520 manages a common memory map table for BEA 500. The memory map table corresponds to memory locations included in BEA 500, such as L2 memory 530 as well as non-private memory included in data plane 540.

Data plane 540 includes Synergistic processing element's (SPE) 545, 550, and 555. Each SPE is used to process data information and each SPE may have different instruction sets. For example, BEA 500 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 545, 550, and 555 are connected to processor element bus 560, which passes information between control plane 510, data plane 540, and input/output 570. Bus 560 is an on-chip coherent multi-processor bus that passes information between I/O 570, control plane 510, and data plane 540. Input/output 570 includes flexible input-output logic which dynamically assigns interface pins to input output controllers based upon peripheral devices that are connected to BEA 500.

Figure 6:
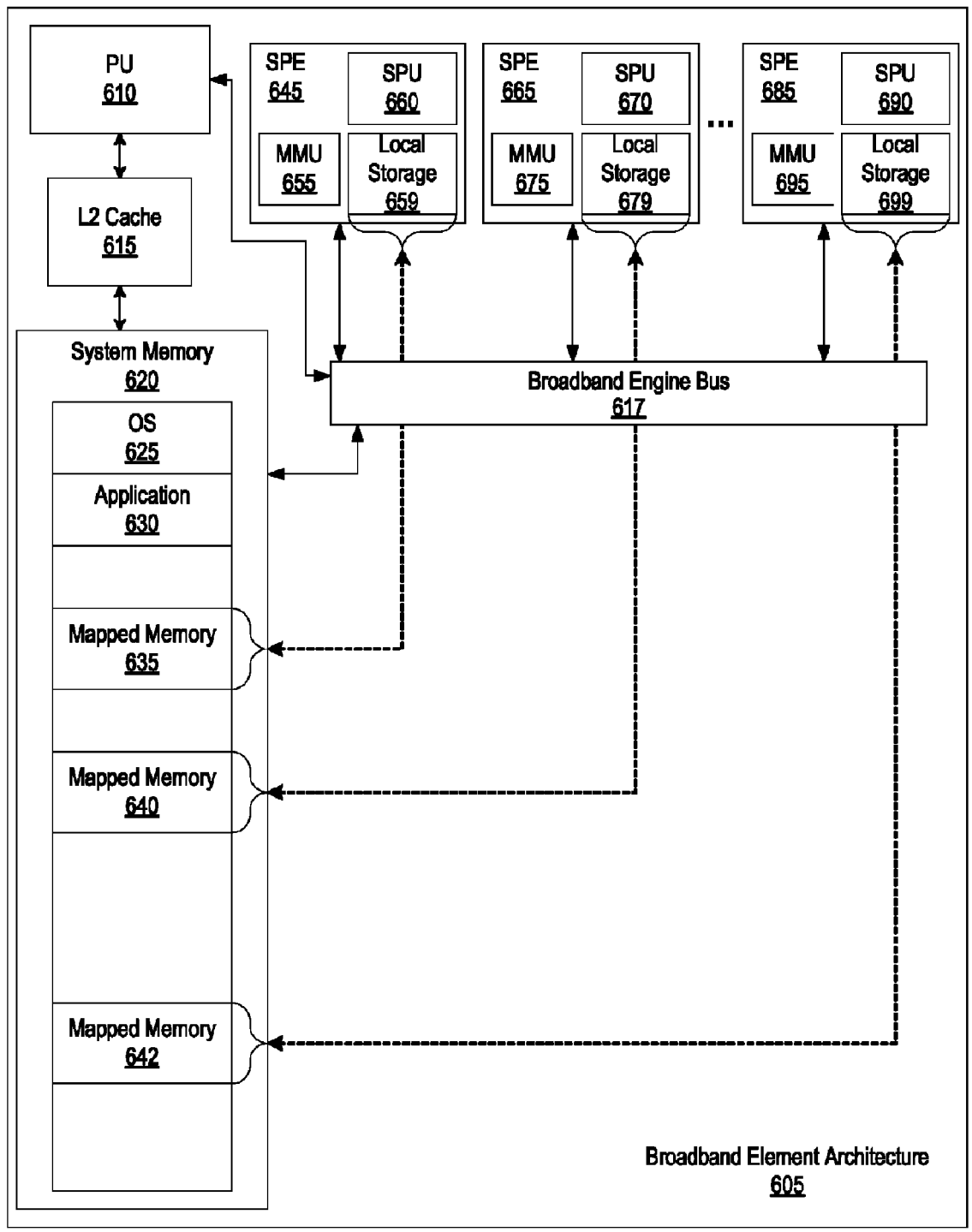
FIG. 6 is a block diagram illustrating a processing element having a main processor and a plurality of secondary processors sharing a system memory.

FIG. 6 is a block diagram illustrating a processing element having a main processor and a plurality of secondary processors sharing a system memory. Broadband Element Architecture (BEA) 605 includes processing unit (PU) 610, which, in one embodiment, acts as the main processor and runs the operating system. Processing unit 610 may be, for example, a Power PC core executing a Linux operating system. BEA 605 also includes a plurality of synergistic processing elements (SPEs) such as SPEs 645 through 685. Each SPE includes a synergistic processing unit (SPU) that act as secondary processing units to PU 610, a memory storage unit, and local storage. For example, SPE 645 includes SPU 660, MMU 655, and local storage 659; SPE 665 includes SPU 670, MMU 675, and local storage 679; and SPE 685 includes SPU 690, MMU 695, and local storage 699.

In one embodiment, the SPEs process data under the control of PU 610. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 610 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 605 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 610 as well as by the other SPEs by mapping each shared region to system memory 620. In one embodiment, PU 610 manages the memory map for the common system memory 620. The memory map table may include PU 610's L2 Cache 615, system memory 620, as well as the SPEs' shared local stores.

A portion of system memory 620 as shown is occupied by the operating system (OS 625). System Memory 625 also contains data 640, which represents data to be processed by SPU 610 as well as by the SPEs. In one embodiment, a process executing on the PU receives a request for a task involving the processing of large data. The PU first determines an optimum method for performing the task as well as an optimum placement of the data in common system memory 620. The PU may then initiate a transfer of the data to be processed from disk 635 to system memory 620. In one embodiment, the PU arranges the data in system memory 625 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 620. This procedure may be repeated as SPEs become available until all the data blocks have been processed.

Figure 7:
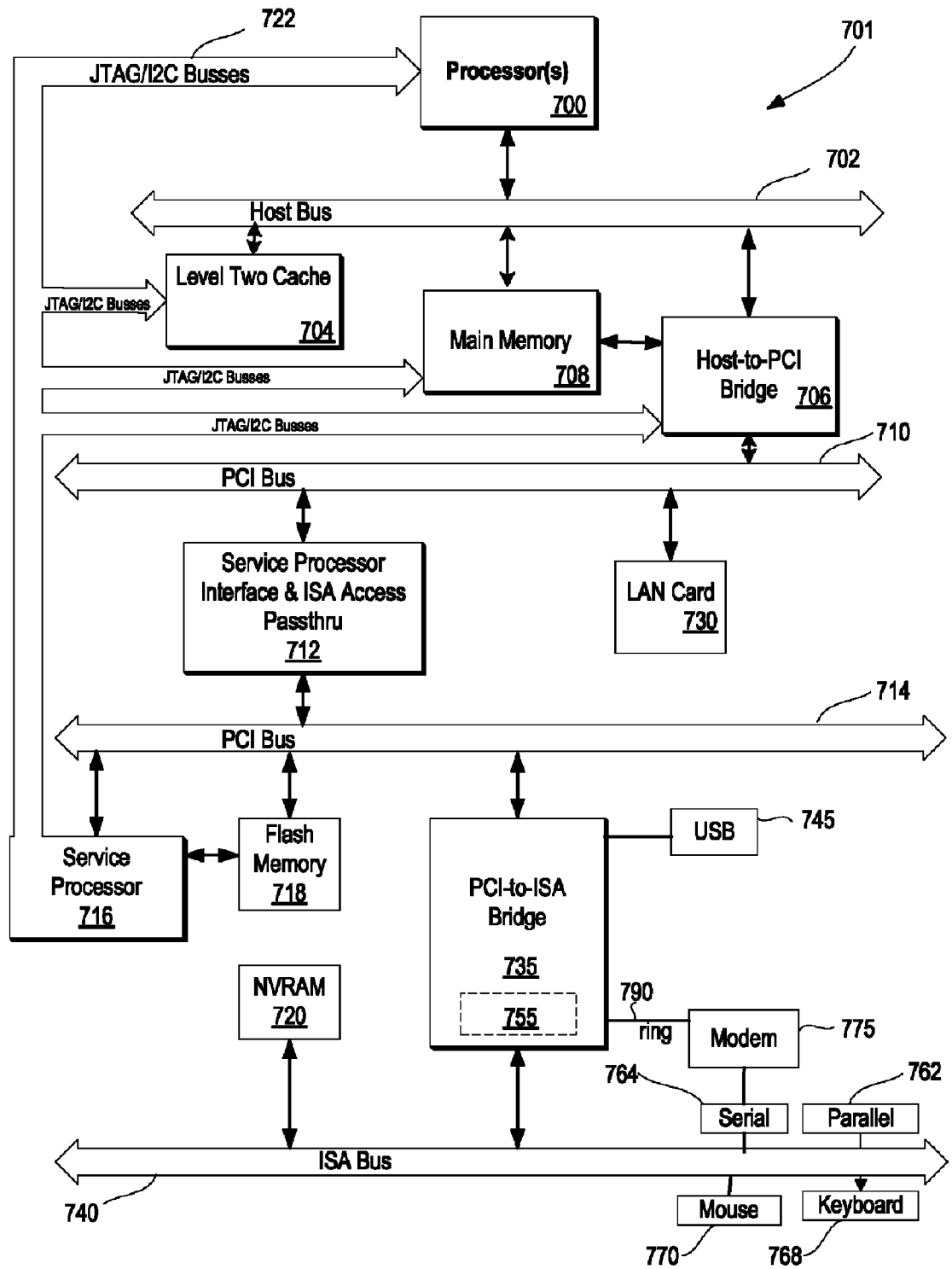
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
  receiving a test case that includes a bit mask;

configuring a plurality of machine state register bits into a first machine state register bit set based upon the bit mask;

loading the test case and the first machine state register bit set into a processor, wherein the first machine state register bit set enables the processor to operate in a first processor mode;

executing the test case using the processor operating in the first processor mode;

after executing the test case, re-configuring the plurality of machine state register bits into a second machine state register bit set based upon the bit mask;

re-loading the test case and the second machine state register bit set into the processor, wherein the second machine state register bit set enables the processor to operate in a second processor mode that is different than the first processor mode; and re-executing the test case using the processor operating in the second processor mode.

2. The method of claim 1 further comprising:
building the test case, wherein the building comprises:
identifying one or more invariant bits from the plurality of machine state register bits, wherein the invariant bits are changeable and do not alter results of executing the test case; and
wherein the re-configuring changes one or more of the invariant bits.

3. The method of claim 2 wherein building the test case further comprises:
identifying one or more unalterable bits from the plurality of machine state register bits; and
wherein the identifying the one or more invariant bits comprises excluding a given bit when the given bit is included in the one or more unalterable bits.

4. The method of claim 3 wherein the building further comprises:
simulating the test case in a mode based upon the unalterable bits;
in response to the simulation, identifying one or more compensation values and one or more corresponding semi-invariant bits;
including the compensation values into the test case; and
altering the semi-invariant bits during the re-configuring.

5. The method of claim 1 wherein a scheduler uses the bit mask to identify one of the plurality of machine state register bits whose value is changeable without changing the outcome of the execution of the test case; and
changing the identified machine state register bit's value during the re-configuration.

6. The method of claim 1 wherein the plurality of machine state register bits define the processor state.

7. The method of claim 1 further comprising:
forcing the plurality of machine state register bits to a 64-bit value; and
performing the executing and the re-executing in a 64-bit mode.

8. An information handling system comprising:
one or more processors;
a memory accessible by the processors;
one or more nonvolatile storage devices accessible by the processors; and
a set of instructions stored in the memory, wherein one or more of the processors executes the set of instructions in order to perform actions of:
receiving a test case that includes a bit mask;
configuring a plurality of machine state register bits into a first machine state register bit set based upon the bit mask;

loading the test case and the first machine state register bit set into a processor, wherein the first machine state register bit set enables the processor to operate in a first processor mode;

executing the test case using the processor operating in the first processor mode;

after executing the test case, re-configuring the plurality of machine state register bits into a second machine state register bit set based upon the bit mask;

re-loading the test case and the second machine state register bit set into the processor, wherein the second machine state register bit set enables the processor to operate in a second processor mode that is different than the first processor mode; and re-executing the test case using the processor operating in the second processor mode.

9. The information handling system of claim 8 further comprising an additional set of instructions in order to perform actions of:
building the test case, wherein the building comprises:
identifying one or more invariant bits from the plurality of machine state register bits, wherein the invariant bits are changeable and do not alter results of executing the test case; and
wherein the re-configuring changes one or more of the invariant bits.

10. The information handling system of claim 9 further comprising an additional set of instructions in order to perform actions of:
identifying one or more unalterable bits from the plurality of machine state register bits; and
wherein the identifying the one or more invariant bits comprises excluding a given bit when the given bit is included in the one or more unalterable bits.

11. The information handling system of claim 10 further comprising an additional set of instructions in order to perform actions of:
simulating the test case in a mode based upon the unalterable bits;
in response to the simulation, identifying one or more compensation values and one or more corresponding semi-invariant bits;
including the compensation values into the test case; and
altering the semi-invariant bits during the re-configuring.

12. The information handling system of claim 8 wherein a scheduler uses the bit mask to identify one of the plurality of machine state register bits whose value is changeable without changing the outcome of the execution of the test case; and
changing the identified machine state register bit's value during the re-configuration.

13. The information handling system of claim 8 wherein the plurality of machine state register bits define the processor state.

14. A computer program product stored on a computer operable media, the computer operable media containing instructions for execution by a computer, which, when executed by the computer, cause the computer to implement a method of processing test patterns, the method comprising:
receiving a test case that includes a bit mask;
configuring a plurality of machine state register bits into a first machine state register bit set based upon the bit mask;

loading the test case and the first machine state register bit set into a processor, wherein the first machine state register bit set enables the processor to operate in a first processor mode;

executing the test case using the processor operating in the first processor mode;

after executing the test case, re-configuring the plurality of machine state register bits into a second machine state register bit set based upon the bit mask;

re-loading the test case and the second machine state register bit set into the processor, wherein the second machine state register bit set enables the processor to operate in a second processor mode that is different than the first processor mode; and re-executing the test case using the processor operating in the second processor mode.

15. The computer program product of claim 14 wherein the method further comprises:

building the test case, wherein the building comprises:

identifying one or more invariant bits from the plurality of machine state register bits, wherein the invariant bits are changeable and do not alter results of executing the test case; and wherein the re-configuring changes one or more of the invariant bits.

16. The computer program product of claim 15 wherein building the test case further comprises:

identifying one or more unalterable bits from the plurality of machine state register bits; and wherein the identifying the one or more invariant bits comprises excluding a given bit when the given bit is included in the one or more unalterable bits.

17. The computer program product of claim 16 wherein the building further comprises:

simulating the test case in a mode based upon the unalterable bits;

in response to the simulation, identifying one or more compensation values and one or more corresponding semi-invariant bits;

including the compensation values into the test case; and altering the semi-invariant bits during the re-configuring.

18. The computer program product of claim 14 wherein a scheduler uses the bit mask to identify one of the plurality of machine state register bits whose value is changeable without changing the outcome of the execution of the test case; and changing the identified machine state register bit's value during the re-configuration.

19. The computer program product of claim 14 wherein the plurality of machine state register bits define the processor state.

20. The computer program product of claim 14 wherein the method further comprises:

forcing the plurality of machine state register bits to a 64-bit value; and performing the executing and the re-executing in a 64-bit mode.

* * * * *